United States Patent [19]
Nagura

[11] Patent Number: 5,612,789
[45] Date of Patent: Mar. 18, 1997

[54] VIDEO SIGNAL RECORDER AND VIDEO APPARATUS WITH INTERNAL CLOCK INDEX SIGNAL

[75] Inventor: Kazuhiro Nagura, Kanagawa, Japan

[73] Assignee: Sony Corporation, Tokyo, Japan

[21] Appl. No.: 293,960

[22] Filed: Aug. 24, 1994

[30] Foreign Application Priority Data

Sep. 3, 1993 [JP] Japan .................................. 5-219835
Sep. 14, 1993 [JP] Japan .................................. 5-229001

[51] Int. Cl.$^6$ .................................................. H04N 5/91
[52] U.S. Cl. ............................... 386/65; 360/69; 386/83
[58] Field of Search ................................. 358/336, 341, 358/335; 348/616, 617; 360/38.1, 14.2, 14.3

[56] References Cited

U.S. PATENT DOCUMENTS

| | | | |
|---|---|---|---|
| 4,733,312 | 3/1988 | Morimoto | 360/10.1 |
| 4,805,040 | 2/1989 | Oku et al. | 358/336 |
| 4,943,858 | 7/1990 | Kitaura et al. | 348/616 |
| 5,034,823 | 7/1991 | Geerlings | 358/314 |
| 5,392,129 | 2/1995 | Ohtaka et al. | 358/336 |
| 5,408,474 | 4/1995 | Wakamori et al. | 358/336 |

*Primary Examiner*—Thai Q. Tran
*Assistant Examiner*—Y. Lee
*Attorney, Agent, or Firm*—William S. Frommer; Alvin Sinderbrand

[57] ABSTRACT

The VCR (video cassette recorder) inserts an index signal into a video signal at the time of recording, when information which will later become inaccurate at the time of playback is included in the video signal. The index signal prevents the VCR from using the inaccurate data at the time of playback. Further, the VCR displays a message automatically when the broadcast signal selected by the user has no second audio signal, thereby allowing the user to grasp the reason why the receiver is producing no sound. Further, the main audio signal may be selected automatically, instead of the second audio signal, allowing the VCR to produce the sound.

6 Claims, 5 Drawing Sheets

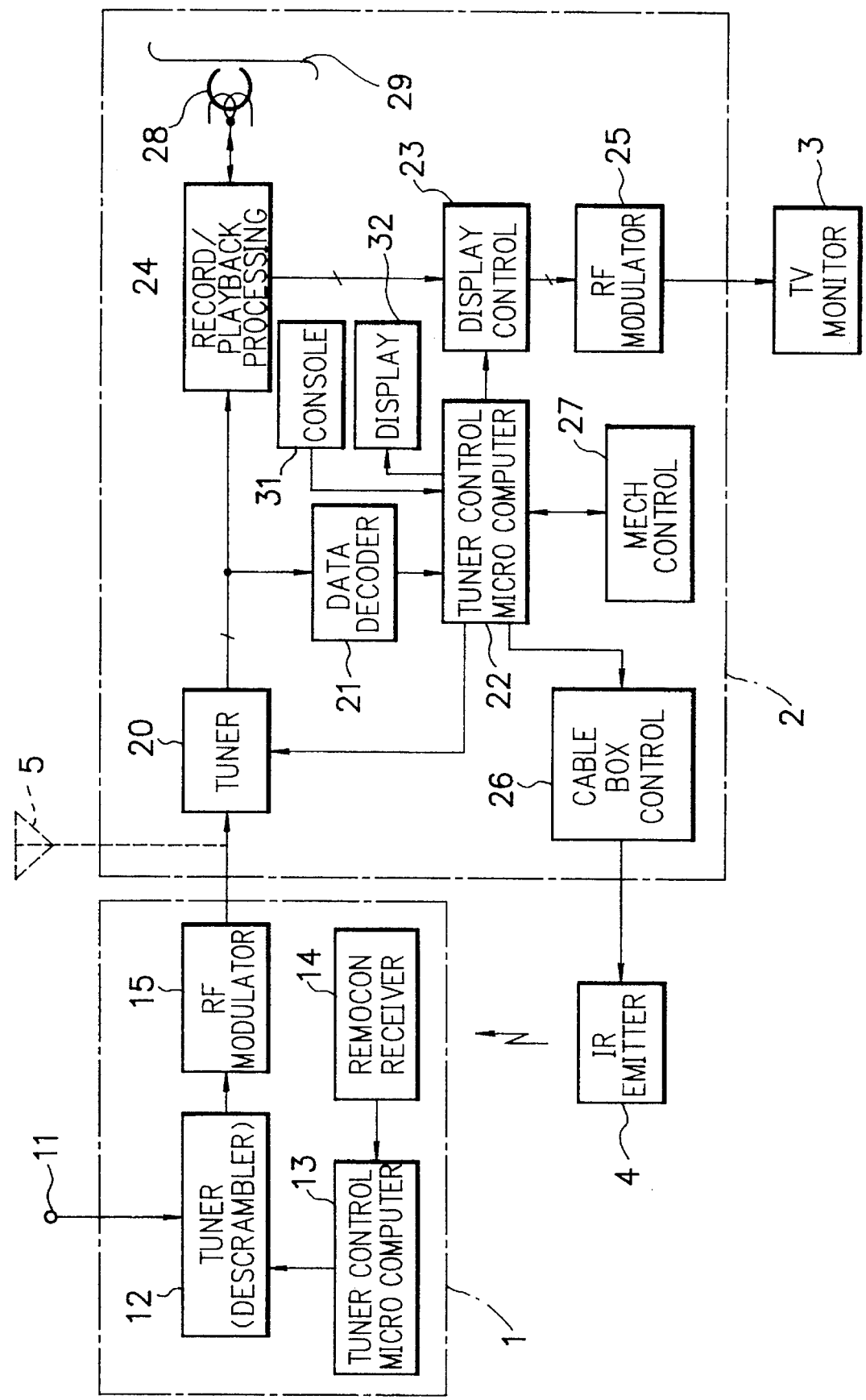
F I G. 3

VIDEO SIGNAL RECORDER AND VIDEO APPARATUS WITH INTERNAL CLOCK INDEX SIGNAL

FIELD OF THE INVENTION

The present invention relates in general to a broadcast signal receiver, and in particular, to a video apparatus that use information included in a broadcast signal, such as a VCR (video cassette recorder) or a TV (television set), and to an audio signal receiver which selectively receives a main audio signal or second audio signal, all of which can be included in a broadcast signal.

BACKGROUND OF THE INVENTION

Description of the Related Art

Formerly, when using an apparatus with a timer, such as a VCR (video cassette recorder), the user had to set the internal clock for the VCR manually, confirming the time with the display on a TV monitor or on a commander (remote control transmitter). Therefore, a timer operation (e.g., a pre-set timer recording with the VCR) is of no use for a person who finds it difficult to set such an internal clock. Even if the internal clock has been set initially, it may require adjustment in the event the power supply cord is pulled out of the socket, a long time has passed, or there has been a change between daylight saving and ordinary time. It is often troublesome for a user to set the internal clock again manually.

However, when setting the internal clock automatically, the broadcast signal receiver may accidentally set the clock on the basis of inaccurate time data due to receiving, as input, a playback video signal from the external VCR or from another source which includes the time data different from the actual current time. In addition to this case, problems may be caused during operations in which data is extracted from the VBI data other than for purpose of the setting of the internal clock.

In order to save the user from these difficulties, it is disclosed herein that such an internal clock may be set according to information included in the video signal, in other words, time data extracted from VBI data which are multiplexed with the vertical interval time code of the video signal.

Further, FIG. 4 illustrates the frequency spectrum of sound multiplex broadcast signals used in the USA. The main carrier of the sum signal (L+R) composed of a left audio signal L and a right audio signal R has the maximum frequency deviation of ±25 kHz, pre-emphasized from the sender's side (for example, with a pre-emphasis of 75 microsecond in time).

The main carrier of the difference signal (L−R), between the left audio signal L and the right audio signal R, modulated with the carrier suppression AM modulation, in other words, the double side band modulation (DSB modulation), has the maximum frequency deviation of ±50 kHz. Under these circumstances, the sub-carrier has a frequency of 2 fH (1 fH is equal to 15.7342 kHz in horizontal frequency).

Reference character PT denotes the pilot signal necessary to demodulate the difference signal (L−R) modulated with the carrier suppression AM modulation. The pilot signal PT has a frequency of fH and its main carrier has a maximum frequency deviation of ±5 kHz.

A sub-audio channel signal, SAP, (second audio signal) is FM-modulated so as to allow the sub-carrier to have a maximum frequency deviation of ±10 kHz, and the main carrier to have a maximum frequency deviation of ±15 kHz in the main carrier under these circumstances, the sub-carrier has a frequency of 5 fH.

FIG. 5 illustrates the structure of an audio multiplex demodulation circuit for demodulating the audio multiplex broadcast signal. An audio multiplex broadcast signal SA (see the frequency spectrum in FIG. 4), given at an input terminal 41 from an audio signal detection circuit (not shown), is supplied to a low-pass filter 42 which has a cut-off frequency of 3 fH. The low-pass filter 42 extracts the sum signal (L+R) and the difference signal (L−R) modulated with the carrier suppression AM modulation, and these signals are thereafter supplied as input to a stereo decoder 43.

The decoder 43 demodulates the difference signal modulated with the carrier suppression AM modulation, with the pilot signal Pt. The band width of the sum signal (L+R) from the decoder 43 is limited by a low-pass filter 44 (with a cut-off frequency of 12 kHz), and, thereafter, de-emphasized through a de-emphasis circuit 45, and supplied as input to a matrix circuit 46.

The band width of the difference signal supplied from the decoder 43 is limited through a low-pass filter 47 (with a cut-off frequency of 12 kHz), reduced in noise through a noise reduction circuit 48, and thereafter supplied to the matrix circuit 46. The matrix circuit 46 handles the matrix processing of the sum signal (L+R) and the difference signal (L−R) so as to provide the right audio signal L and the right audio signal R to a switch circuit 49.

The audio multiplex signal SA is supplied by the input terminal 41 to a band pass filter 50 having a central frequency of 5 fH, which extracts the FM-modulated second audio signal SAP, and such second audio signal is thereafter supplied as input to a SAP decoder 51. The decoder 51 demodulates the FM-modulated second audio signal SAP. The output from the decoder 51 is the second audio signal SAP which is supplied as input to a low-pass filter 52 (having a cut-off frequency of 12 kHz) where the band width of such second audio signal is limited, and the signal is thereafter supplied to the switch circuit 49 via a noise reduction circuit 53.

The switch circuit 49 also receives a switching control signal SW indicating the selection of one of the signals, either the main audio signal or the second audio signal. When the user selects the main audio signal in the broadcast signal receiver, the outputs at the output terminals 54L and 54R from the switch circuit 46 are, respectively, the left audio signal L and the right audio signal R. On the other hand, when the user selects the second audio signal, the outputs at the output terminals 54L and 54R both comprise the second audio signal SAP.

When the audio multiplex signal SA has no difference signal (L−R) modulated with the carrier suppression AM modulation, in other words, is a monoral signal, the outputs from the matrix circuit 46 are the same monoral audio signals (L+R). At this point, when the user selects the main audio signal, the monoral audio signals (L+R) are supplied as output at both the output terminals 54L and 54R.

Moreover, the audio multiplex signal, for which the frequency spectrum is illustrated in FIG. 4, does not always have a second audio signal SAP. When the user selects the second audio signal when the audio multiplex signal has no second audio signal, the broadcast signal receiver produces no sound. At that time, the user may feel uneasy about receiving no sound, because the user is not likely to understand the cause.

References which relate to the present invention are U.S. Pat. No. 4,329,684, U.S. Pat. No. 4,390,901, U.S. Pat. No. 4,499,179, and U.S. Pat. No. 4,635,121.

OBJECT AND SUMMARY OF THE INVENTION

It is accordingly an object of the invention to provide an improved video device which is prevented from using data from a playback earlier recorded when that data has become inappropriate or incorrect as of the time.

It is accordingly another object of the invention to provide an improved broadcast signal receiver that provides information to help the user understand the reason why the receiver may be producing no sound when a second audio signal has been selected but such second audio signal is not provided.

A video signal recorder according to the first invention, comprises an information detecting means for detecting information at the time of recording a video signal which includes information that becomes inaccurate at the time of a later playback of the recorded video signal, and an index signal insertion means for inserting an index signal into such video signal when the information detecting means detects such inaccurate information in the video signal to be recorded.

A video signal recorder according to the second invention, comprises an index signal detecting means for detecting an index signal which prevents the video signal recorder from using information which has become inaccurate at the time of the playback of the video signal recorded at an earlier time, and a control means for preventing the video signal recorder from using such inaccurate information when the index signal detecting means detects such index signal in the recorded video signal.

An audio signal receiver according to the third invention, comprises a signal receiving means for receiving a broadcast signal, an audio output means for selectively producing a sound from at least one of a main audio signal or a second audio signal, which are multiplexed together in the broadcast signal, a signal detecting means for detecting the presence of such second audio signal in the broadcast signal, and a control means for directing a display to display the message which allows the user to understand that the broadcast signal does not contain a second audio signal when the signal detecting means can not detect the presence of a second audio signal.

Another audio signal receiver according to the third invention, comprises a signal receiving means for receiving a broadcast signal, an audio output means for selectively producing a sound from at least one of a main audio signal or a second audio signal which are multiplexed together in the broadcast signal, a signal detecting means for detecting the presence of a second audio signal in the broadcast signal; and a control means for directing the audio output means to produce sound from the main audio signal when the signal detecting means dose not detect the presence of a second audio signal.

In accordance with one aspect of the first invention, a video signal recorder inserts an index signal into the video signal at the time of recording when the video signal being recorded includes information (for example, time information) which will become inaccurate at the time the recording is played back. The index signal prevents the video signal recorder from using such wrong data during a later playback.

In accordance with another aspect of the second invention, when a video signal which includes such index signal is supplied as input to the video signal recorder from an external apparatus, the index signal similarly prevents the video signal recorder from using the wrong data.

In accordance with still another aspect of the third invention, when a broadcast signal has no second audio signal but the second audio signal is accidentally selected by the user, the broadcast signal receiver displays an appropriate message, thereby allowing the user to understand the reason why the receiver is producing no sound. The main audio signal may then be selected, in place of the second audio signal, allowing the production, setting the users's mind at ease.

These and other objects and many of the attendant advantages of this invention will be readily appreciated as the same becomes better understood by reference to the following detailed description when considered in conjunction with the accompanying drawings.

BRIEF DESCRIPTION OF THE DRAWINGS

FIG. 3 is a block diagram illustrating the construction of the second embodiment according to the present invention;

DESCRIPTION OF THE PREFERRED EMBODIMENT

The first embodiment, in which the present invention applies to a closed-captioned system, is described below in connection with FIG. 1.

Figure 1:
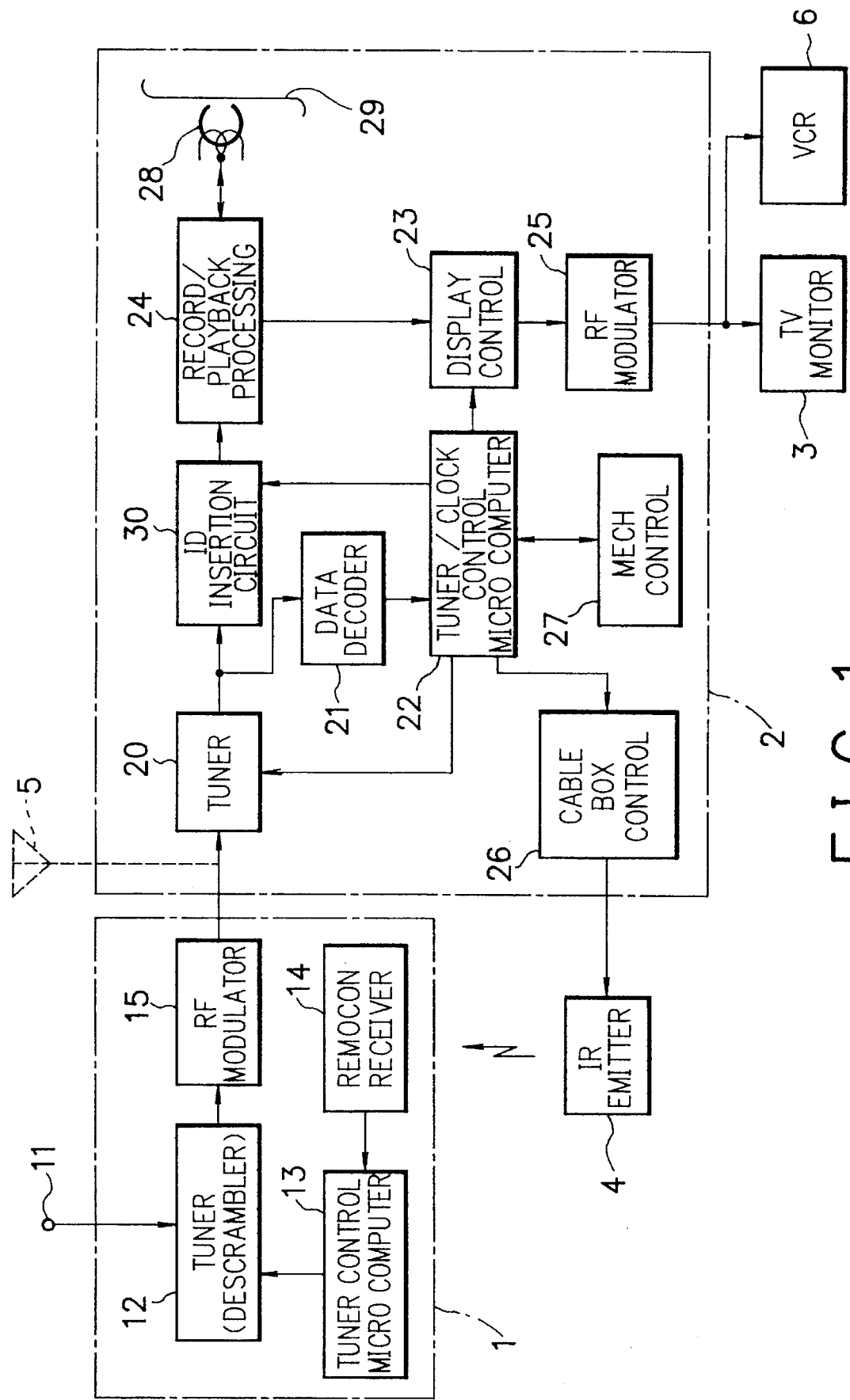
FIG. 1 is a block diagram illustrating the construction of the first embodiment according to the present invention.

In FIG. 1, a cable box functions to select and descramble CATV signals. The CATV signals, transmitted by cable (not shown), are supplied to the tuner 12 via the input terminal 11. The tuner 12 selects a channel from the CATV signals with a tuner control micro computer, and provides a video signal of the selected channel. The tuner 12 also has a descrambler which descrambles the scrambled video signal.

Reference numeral 14 denotes the remote control signal receiver which receives a remote control signal (an infrared ray "IR" signal) from an IR emitter which is described below, and provides an information signal to the micro computer 13. The information signal contains information about the channel selection and on-off control.

The video signal from the tuner 12 is supplied to a RF modulator 15, which converts the video signal into a broadcast signal for the selected channel which is then supplied to a tuner 20 in the VCR (video cassette recorder) 2. The tuner 20 selects a channel through the tuner/clock micro computer 22.

Figures 2A, 2B:
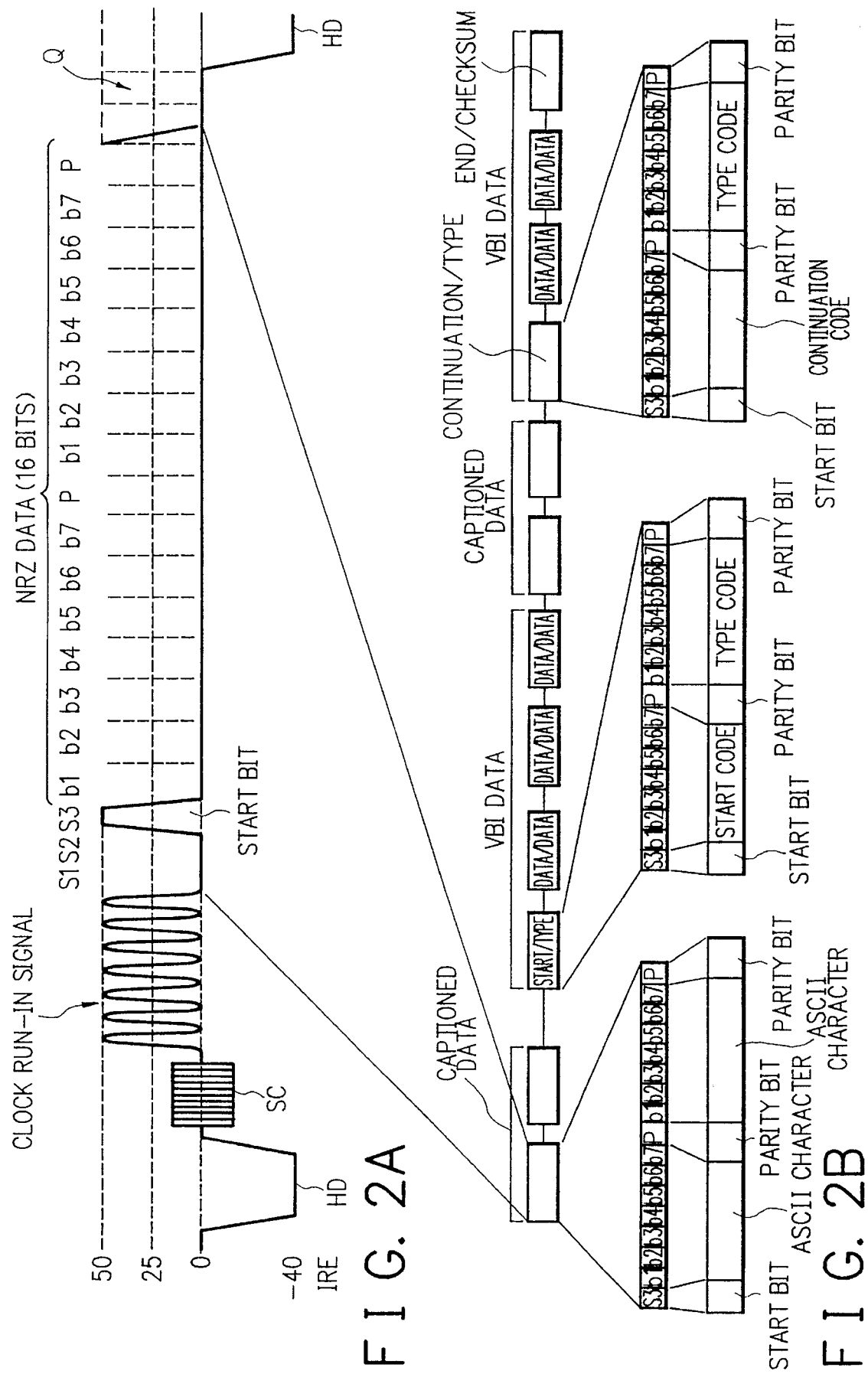
FIGS. 2A and 2B are diagrams for explaining VBI data multiplexed with the broadcast signal.
Figure 4:
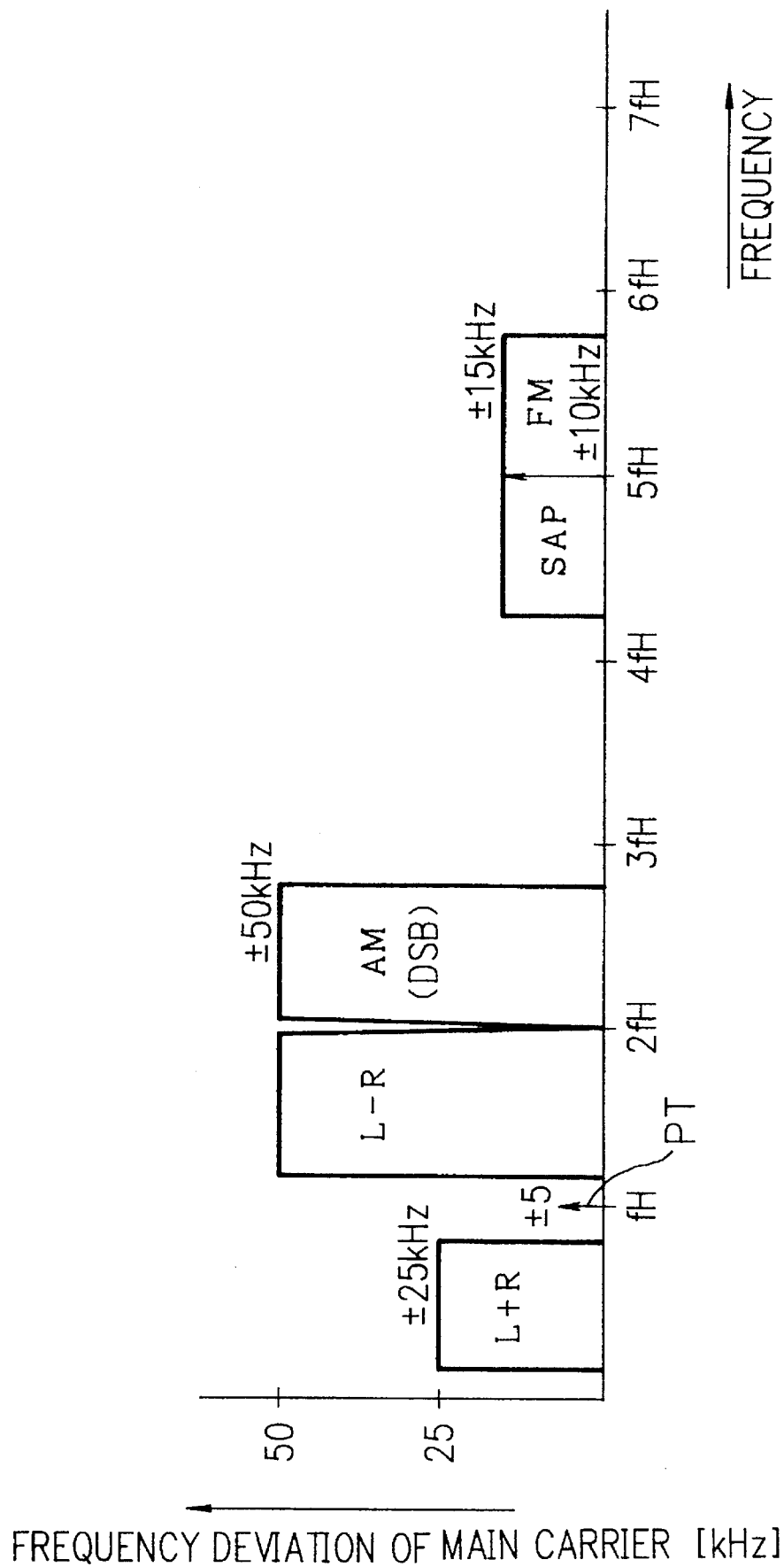
FIG. 4 is a table for explaining the frequency spectrum of an audio multiplex signal.

A NTSC-type video signal from the tuner 20 is supplied to a data decoder 21. Captioned data (subtitle data) are inserted into a predetermined line of a vertical interval time code of the NTSC-type video signal. As shown in FIG. 2A, the captioned data consist of 7 cycles (503 KHz) of a clock run-in signal, two bits S1 and S2 at a low logic level ("0")

followed by a start bit S3 at a high logic level ("1"), and 16 bits of NRZ data (a data code). The clock run-in signal is a synchronizing signal with the data code, and synchronizes the data code in phase. The sixteen bits of the NRZ data are composed of a pair of groups which each consist of 7 bits b1 to b7 of an ASCII character and a bit of a parity code. In FIG. 2A. HD denotes a horizontal synchronizing signal, and SC denotes a color burst signal.

When captioned data are multiplexed with the predetermined line of the vertical interval time code of the video signal from the tuner 20, a data decoder 21 extracts the NRZ data, decodes its hexadecimal code into a BCD code, and supplies the decoded captioned data to the micro computer 22. In this case, the captioned data are stored in the RAM (random access memory), which is not shown, of the micro computer 22 on a predetermined frame basis, so that captions are displayed on the screen with pauses between sentences on a predetermined frame basis.

The captioned data read out from the RAM of the micro computer 22, are supplied to the display control circuit 23, and are converted into character data (dot data). The control signal, which indicates a display position on the screen, is also supplied to the display control circuit 23. The display control circuit 23 generates a superimposed signal in accordance with the timing of the indicated display position and the character data, and the superimposed signal is overlapped onto the video signal supplied from the tuner 20 via a record/playback signal processing circuit 24.

The RF modulator 25 converts the video signal, provided from the display control circuit 23, into the broadcast signal of a selected channel, which is thereafter supplied to the TV monitor 3. Accordingly, captions can be superimposed on the screen of the TV monitor 3, when the captioned data is multiplexed with the video signal provided from the tuner 20.

Reference numeral 26 denotes a control driver for the cable box. Through the micro computer 22, the control driver 26 causes the IR emitter 4 to provide a remote control signal to the cable box 1. Accordingly, the VCR 2 can control the channel selection and the on-off control of the cable box 1.

Reference numeral 27 denotes a micro computer for controlling mechanisms such as a head drive, a reel drive, and a tape feeder.

During recording with the VCR 2, the video signal from the tuner 20 is supplied as input to a signal processing circuit 24 via an ID insertion circuit 30. Upon receiving the video signal, the signal processing circuit 24 generates a record signal which is thereafter supplied to a magnetic head 28, by which the signal is recorded onto magnetic tape 29. During playback of the signal, the signal processing circuit 24 generates a play-back video signal from the signal generated by the magnetic head 28. The playback video signal is supplied to the TV monitor 3 via the display control circuit 23 and the RF modulator 25 so as to display the video image.

When the captioned data is not multiplexed with the predetermined line of vertical interval time code in the video signal, special information (VBI data) can be transmitted through the line. For example, VBI data can include time information, such as the time of day and daylight saving time use ("DST use"), current and future program information such as start times, elapsed time, and contents, station information, and information about weather and disasters.

As shown in FIG. 2B, the VBI data are defined as being in the same format as the captioned data. Groups of the VBI data are transmitted on a plurality of lines. The VBI data in each of the lines is comprised of 16 bits of the NRZ data (a pair of groups which each are comprised of 7 bits b1 to b7 of a code and a bit of a parity code) beginning with the start bit.

In the first line on which groups of VBI data are transmitted, the first 7 bits carry a start code which indicates the class of VBI data, and the later 7 bits carry a code which indicates the type (sub-type) of the VBI data. Beginning with the second line, the first 7 bits and the later 7 bits carry the data relating to the class or the actual type of data indicated in the first line.

As described above, the VBI data can be transmitted as long as the time captioned data is not being transmitted. If the captioned data transmission starts before the completion of the VBI data transmission, the VBI data transmission is interrupted, and re-starts after the completion of the captioned data transmission (see FIG. 2B). Just after re-starting, the first 7 bits carry a continuation code in the first line, and the later 7 bits carry the code indicating the type of data.

In the last line of the VBI data transmission, the first 7 bits carry an end code, and the later 7 bits carry a check sum.

Examples of the classes and their types of data are described below.

The classes "Current Program Information" and "Future Program Information" each have types of data such as "Program Start Time", "Length/Time Elapsed", "Program Title", "Program Type", "Program Audience", "Main Sound and Second Sound", and so on. The class "Channel Information" (special information about a selected channel other than the program being reviewed) has types of data such as "Name of Network" (a network name related to the selected local station), "Station ID", "Tape Delay" (tape delay hours and minutes for the network programs from the local station), and so on. The class "Miscellaneous Information" has types of data such as "Greenwich Time", "Local Time Zone and Daylight Saving Time Use", and so on. A class "Public Service/Weather Service/Message" has types, such as "Weather Service".

In the first embodiment, when detecting the time data transmitted in the VBI data, the micro computer 22 directs the ID insertion circuit 30 to insert an index signal in the video signal supplied from the tuner 20. For example, the index signal is inserted at a point (denoted by reference character "Q" in FIG. 2) immediately following to 16 bits of the NRZ data in the predetermined line of the vertical interval time code. The VCR 2 records the video signal, inserting the index signal, when the video signal includes the time data from the VBI data.

The micro computer 22 extracts time data, transmitted in the VBI data, by which the internal clock is set automatically. In this situation, the class indicates "Miscellaneous Information", and the types of data include "Greenwich Time" and "Local Time Zone and Daylight Saving Time Use". Local time data can be determined by measuring Greenwich Time and the time difference from Greenwich Time.

The micro computer 22 also receives the data, indicating the presence of an index signal in the video signal, from the data decoder 21. When detecting the index signal, the micro computer 22 prevents the internal clock from being reset according to such inaccurate time data which differs from the actual current time.

Further, in FIG. 1, reference numeral 6 denotes another VCR, having the same structure as the VCR 2, to which the playback video signal is supplied from the signal processing circuit 24 via the display control circuit 23 and the RF modulator 25. When detecting the index signal, the second VCR 6 also prevents its internal clock from being reset according to the inaccurate time data.

Although, in the first embodiment, the broadcast signal, from which a channel is selected by the tuner 12 in the cable box 1, is supplied to the tuner 20 in the VCR 2, this invention may also be applicable to a more simple arrangement with a VCR in which an antenna 5 (shown in FIG. 1 by the dotted line) or a cable (not shown) directly supplies the broadcast signal to the tuner 20.

Further, it is feasible for the TV monitor 3 to also provide the function of preventing the internal clock from being reset according to inaccurate time data.

Although, in the first embodiment, the time data is extracted from the VBI data multiplexed with the vertical interval time code, portions, other than the vertical interval time code may also carry the time data.

Although the first embodiment relates to the time data, the index signal also prevents the receiver from using other types of data which may becomes inappropriate when an earlier recorded video signal is played back.

Further, in the above embodiment, the format of the VBI data is similar to the format of the captioned data. However, this invention may be used even when the format of the VBI data is different from that of the captioned data.

The second embodiment, in which the present invention also applies to a closed captioned system, is described below in connection with FIG. 3. The second embodiment is similar to that described above in FIG. 1, with the exceptions that the second embodiment provides for a console 31 and a display 32, and does not utilize an ID insertion circuit 30. In addition, the micro computer 22 does not have a clock setting means. Therefore, in FIG. 3, the same reference numerals will denote the parts previously described in FIG. 1, and detailed descriptions will be omitted in the following.

Figure 5:
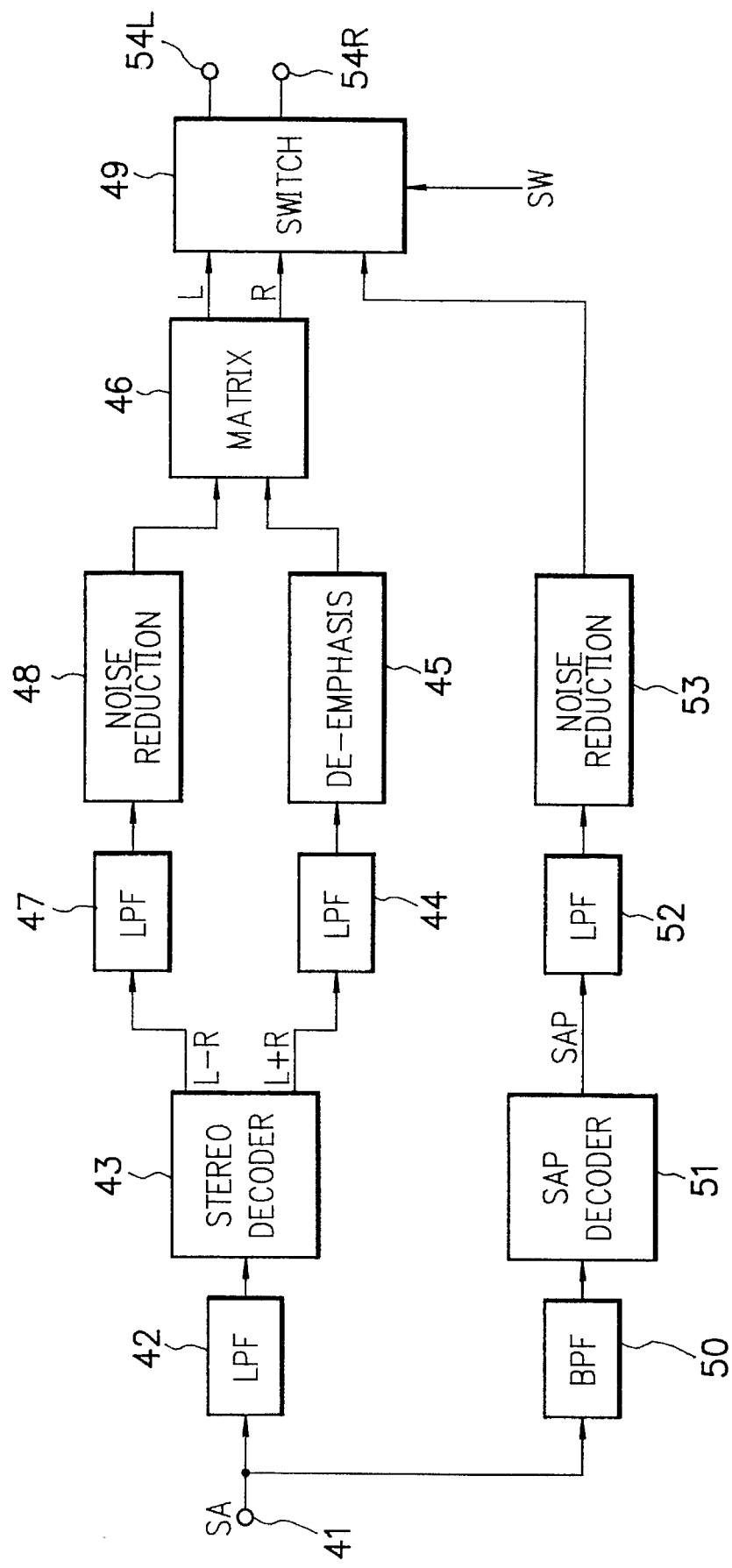
FIG. 5 is a block diagram illustrating the construction of an audio multiplex demodulation circuit.

The tuner 20 has an audio multiplex demodulation circuit, as shown in FIG. 5, which handles the audio signal. The audio signal from the tuner 20 is supplied to the RF modulator 25 via the display control circuit 23. The RF modulator 25 converts the broadcast signal for a selected channel, which has, in addition to the video signal, an audio signal which the TV monitor 3 uses to produce sound.

The micro computer 22 is connected with the console 31, through which the user selects a main audio signal or a sub-audio channel signal (second audio signal) SAP, and is also connected with the display 32 for displaying the control status.

In the second embodiment, the micro computer 22 in the VCR 2 extracts information about the presence of the second audio signal SAP. When it is determined that the broadcast signal has no second audio signal, but such is accidentally selected by the user, the micro computer 22 directs the display 32 to display a message of explanation to the user.

Thus, the VCR 2 displays a message when the broadcast signal has no second audio signal and such signal is accidentally selected by the user. When, through the console 31, the user selects a second audio signal that is not included in the broadcast signal, the user will understand from the display 32 the reason why the receiver is producing no sound.

In the second embodiment, when the VCR 2 displays a message when a broadcast signal that has no second audio signal is selected by the user, the main audio signal may be selected, instead of the second audio signal, allowing the receiver to produce the sound. Needless to say, the message displayed on the display 31 may suggest such new selection.

Although, in the second embodiment, the broadcast signal from which a channel is selected by the tuner 12 in the cable box 1 is supplied to the tuner 20 in the VCR 2, this invention may be also applicable to a VCR 2 as a more simple arrangement with a VCR in which an antenna 5 (shown in FIG. 3 by the dotted line) or a cable (not shown) directly supplies the broadcast signal to the tuner 20.

Although, in the second embodiment, the information about the presence of the second audio signal SAP is extracted from the VBI data multiplexed with the vertical interval time code, portions, other than the vertical interval time code, may also carry the information. This invention may also be used even when the format of the VBI data is different from that of the captioned data. Further, when the user selects the second audio signal through the console 31, the presence of the second audio signal may also be determined according to whether or not the output audio signal provides any sound.

Further, in the second embodiment, the present invention is applied to a closed captioned system. This invention can be applied to a television receiver.

As described above, according to the invention, the VCR inserts an index signal into the video signal at the time of recording when it detects information, such as time data, which will become inaccurate during a later playback. The index signal prevents the VCR from using inaccurate data at the time of playback. An index signal is inserted at the point, associated with the point of the multiplexed information, thereby allowing easy detection and extraction of the index signal. When the signal which includes the index signal is supplied as input to the VCR from an external apparatus, the input index signal similarly prevents the VCR from using the inaccurate data.

According to the invention, the broadcast signal receiver displays a message when the broadcast signal selected by the user has no second audio signal, thereby allowing the user to grasp the reason why the receiver is producing no sound. Further, when determining that the broadcast signal selected by the user has no second audio signal, the main audio signal may be selected instead of the second audio signal then allowing the production of sound.

While the preferred embodiments of the invention have been described above, it will be understood that various modifications may be made thereto, and the invention is intended to cover, with the appended claims, all such modifications as may fall within the true spirit and scope of the invention.

What is claimed is:

1. A video signal recorder for recording a video signal on a record medium, comprising:

information detecting means for detecting, at the time of recording said video signal, information usable by the video signal recorder in its operations, said information being accurate during recording and becoming inaccurate at the time of a later playback of the recorded video signal; an internal clock operable to be set according to said information; and index signal insertion means for inserting an index signal into said video signal which prevents said internal clock from being set in response to said information at the time of the later playback when said information detecting means detects said information in said video signal.

2. The video signal recorder in accordance with claim 1, wherein an accuracy of said information is time dependent such that said information becomes inaccurate after an amount of time between the recording and the playback.

3. The video signal recorder in accordance with claim 1, wherein said video signal includes an interval time code having said information multiplexed therein; and wherein the index signal insertion means inserts said index signal within said interval time code.

4. The video signal recorder in accordance with claim 2, wherein said video signal includes an interval time code having said information multiplexed therein; and wherein the index signal insertion means inserts said index signal within said interval time code.

5. A video signal recorder for playing back a recorded video signal from a record medium, comprising:

index signal detecting means for detecting an index signal indicating that said video signal played back by said video signal recorder includes information, usable by said video signal recorder in its operations, which was information accurate during recordation of the video signal and has become inaccurate at the time of playback of said video signal; an internal clock operable to be set according to said information; and control means for preventing said internal clock from being set when said index signal detecting means detects said index signal in said video signal.

6. The video signal recorder in accordance with claim 5, wherein an accuracy of said information is time dependent such that said information becomes inaccurate after an amount of time between the recording and the playback.

* * * * *